(12) United States Patent
Finazzi et al.

(10) Patent No.: US 12,723,992 B2
(45) Date of Patent: Sep. 1, 2026

(54) APPARATUS FOR DETECTING SURFACE DEFECTS IN OBJECTS

(71) Applicant: UTPVISION S.R.L., Albano Sant'Alessandro (IT)

(72) Inventors: Roberto Finazzi, Bolgare (IT); Sergio Sigala, Ospitaletto (IT)

(73) Assignee: UTPVISION S.R.L., Albano Sant' Alessandro (IT)

( * ) Notice: Subject to any disclaimer, the term of this patent is extended or adjusted under 35 U.S.C. 154(b) by 235 days.

(21) Appl. No.: 18/418,249

(22) Filed: Jan. 20, 2024

(65) Prior Publication Data

US 2024/0255441 A1 Aug. 1, 2024

(30) Foreign Application Priority Data

Jan. 31, 2023 (IT) ........................ 102023000001419

(51) Int. Cl.
*G01N 21/88* (2006.01)
*G01N 21/952* (2006.01)
*G01M 13/005* (2019.01)

(52) U.S. Cl.
CPC ....... *G01N 21/952* (2013.01); *G01N 21/8806* (2013.01); *G01M 13/005* (2013.01); *G01N 2201/0634* (2013.01)

(58) Field of Classification Search
CPC ............. G01N 21/952; G01N 21/8806; G01N 2201/0634; G01M 13/005
See application file for complete search history.

(56) References Cited

U.S. PATENT DOCUMENTS 4,242,581 A * 12/1980 Crow .................... G01J 1/4257 250/227.28
6,118,527 A * 9/2000 Jurca .................... B23K 26/707 356/239.2
6,694,284 B1 * 2/2004 Nikoonahad .......... G01N 21/94 702/155
9,134,232 B1 9/2015 Segall
2002/0141463 A1 * 10/2002 Bruun-Larsen ....... H01S 5/0683 372/29.021
2023/0281781 A1 * 9/2023 Dau ....................... H04N 23/81
(Continued)

FOREIGN PATENT DOCUMENTS

DE 19507401 A1 * 10/1995 ........... B23K 26/702
DE 10049851 C1 6/2002
DE 102018217484 A1 4/2020
(Continued)

*Primary Examiner* — Michelle M Iacoletti
*Assistant Examiner* — Jarreas Underwood
(74) *Attorney, Agent, or Firm* — Patterson Intellectual Property Law, PC

(57) ABSTRACT

An apparatus for detecting surface defects in objects comprises one or more illuminating devices configured to emit at least a light radiation and illuminate an object to be inspected. The detection apparatus is further configured to measure the light radiation received by the object, and also comprises one or more image acquisition devices configured to acquire one or more images of the object, when illuminated by the illuminating device, and a data processor configured to process the images acquired by the image acquisition device and provide detection data indicative of the presence of surface defects on the object.

20 Claims, 7 Drawing Sheets

(56) References Cited

U.S. PATENT DOCUMENTS

2023/0419471 A1* 12/2023 Schleith ............... H04N 23/695

FOREIGN PATENT DOCUMENTS

EP 1488882 A1 * 12/2004 ........... B23K 26/707
EP 2280270 A1 2/2011
EP 3105542 B1 12/2016
WO 9833059 A1 7/1998

* cited by examiner 1
2
3
4
6
7
P
31
100
A
L
L_D
150
32
33
S_D
S_M
DS

APPARATUS FOR DETECTING SURFACE DEFECTS IN OBJECTS

CROSS-REFERENCES TO RELATED APPLICATIONS

This application claims the benefit of Italian Patent Application No. 102023000001419, filed Jan. 31, 2023, and which is hereby incorporated by reference in its entirety.

FIELD OF THE INVENTION

The present invention relates to an apparatus for detecting surface defects in objects, for example in industrial seals. In particular, the present invention relates to a detection apparatus that incorporates a measuring device capable of measuring, in real time, the amount of light received by the object inspected.

BACKGROUND

As is known, some components widely used in industry, for example industrial seals of toroidal type (O-rings), must be subjected to careful analysis to identify the presence of defects that could impair their functionality.

In general, at an industrial level, surface inspection of these components is carried out automatically, using dedicated equipment.

An apparatus for detecting surface defects typically comprises a pair of illuminating devices arranged on opposite sides of a transparent support on which the object to be inspected is placed. In this way, the object to be inspected can be illuminated, simultaneously or alternately, with light radiation coming from different directions and having different wavelengths.

The detection apparatus further comprises a video camera or other filming means for acquiring one or more images of the object to be inspected, when illuminated by the illuminating device.

An example of apparatus for detecting surface defects in seals of the O-Ring type is described in the patent application EP2280270A1.

Experience has shown how, during the service life of an apparatus for detecting surface defects in an object, the light radiation, with which the object to be inspected is illuminated, is often subject to a certain decrease in intensity that can reach levels that compromise the process for detecting possible surface defects.

This phenomenon can be due to many causes, for example deterioration of the light sources (for example LEDs) used in the illuminating devices, progressive opacification of surfaces through which the light radiation passes before reaching the object to be inspected, accumulation of dirt on the aforesaid surfaces, and so forth.

To overcome this problem, it is common practice to periodically measure the intensity of the light radiation emitted by the illuminating devices of the apparatus using a suitable portable testing device.

However, this has some inherent limitations of an operational nature mostly linked to the sporadicity of the measurements carried out. In practice, an excessive decrease in the light radiation may be detected with a certain delay with respect to when this problem actually started. This circumstance makes it impossible to ensure that the quality of the inspection activity carried out by the detection apparatus remains consistent over time.

On the other hand, testing the light radiation at relatively short intervals of time (e.g., every hour) would cause unacceptable lengthening of the inspection times and significant increases in labor, given that these tests require the operator to take direct action on the operating field of the machine.

Some conventional detection apparatus include light sensors integrated in the illuminating devices used, at the level of the light sources included in these devices. Although these solutions allow the detection of any phenomena of deterioration of the aforesaid light sources, they do not detect decreases in the intensity of the light radiation linked to opacification or soiling of the surfaces through which the optical path of the light radiation passes.

BRIEF SUMMARY

An apparatus as disclosed herein may be provided for detecting surface defects in an object that overcomes or mitigates the problems in conventional apparatus as for example set forth above.

The present disclosure may accordingly describe certain improvements with respect to conventional apparatus, for example by providing a detection apparatus which ensures high accuracy, consistent over time, of the inspection activities carried out.

A further exemplary improvement over conventional apparatus as disclosed herein may be to provide a detection apparatus that has relatively low overall operating costs with respect to prior art systems of the same type.

A further exemplary improvement over conventional apparatus as disclosed herein may be to provide a detection apparatus that is easy to produce or implement at an industrial level, at competitive costs with respect to prior art systems of the same type.

In various preferred embodiments according to the present disclosure, the apparatus is provided for detecting surface defects in an object comprising an industrial seal of "O-ring" type.

In a general definition thereof, a detection apparatus according to the present disclosure comprises an illuminating device configured to emit at least a light radiation along an optical axis and illuminate the object.

According to an exemplary aspect of the present disclosure, the detection apparatus also comprises an image acquisition device configured to acquire one or more images of the object, when illuminated by the illuminating device, and a data processor configured to process the images acquired by the image acquisition device and provide detection data indicative of the presence of surface defects on the object.

According to another exemplary aspect of the present disclosure, the detection apparatus comprises a measuring device of the light radiation received by the object.

The measuring device comprises at least a platelike body arranged to intersect the optical axis of the illuminating device and receive the light radiation with which the illuminating device illuminates the object. This platelike body comprises a plate of optically active material capable of deflecting, along an extension plane of the plate and toward the edge of the plate, a predetermined portion of the light radiation received from the illuminating device.

The measuring device comprises at least a light sensor optically coupled to the at least a platelike body and configured to receive the portion of light radiation deflected by the plate of optically active material and provide detection signals indicative of the light intensity of the light radiation so received.

Preferably, the at least a light sensor may be arranged at the edge of the plate of optically active material of each platelike body.

Preferably, the at least a platelike body may be arranged so that the extension plane of the plate of optically active material is orthogonal to the optical axis of the illuminating device.

Preferably, the plate of optically active material of the at least a platelike body may be made of polymethyl methacrylate (PMMA) comprising colorless diffusive impurities.

According to some embodiments of an apparatus as disclosed herein, the at least a light sensor may be configured to receive a monochromatic light radiation.

According to other embodiments of an apparatus as disclosed herein, the at least a light sensor may be configured to receive a polychromatic light radiation.

According to some embodiments of an apparatus as disclosed herein, the measuring device may comprise a single light sensor optically coupled to each platelike body.

According to other embodiments of an apparatus as disclosed herein, the measuring device may comprise a plurality of light sensors optically coupled to each platelike body.

According to some embodiments of an apparatus as disclosed herein, the measuring device may comprise a platelike body arranged at an intermediate position between an illuminating device and a first surface of a support at which the object is placed.

According to other embodiments of an apparatus as disclosed herein, the measuring device may comprise a platelike body arranged at an intermediate position between an illuminating device and a second surface of a support of the object. In this case, the object is placed at a first surface of the support opposite the second surface and the support is made of optically transparent material.

According to an exemplary aspect of the apparatus according to the present disclosure, the measuring device may comprise an electronic signal processing unit operatively coupled to the at least a light sensor. The aforesaid electronic signal processing unit may be configured to receive and process the detection signals provided by the at least a sensor and provide measurement signals indicative of the light radiation received by the object.

In a further exemplary aspect, the present disclosure relates to an object inspection station comprising at least detection apparatus as defined above.

BRIEF DESCRIPTION OF THE SEVERAL VIEWS OF THE DRAWINGS

Further features and advantages of the present invention will be more apparent from the detail description of preferred embodiments thereof, provided below by way of non-limiting example, with reference to the accompanying drawings, wherein.

DETAILED DESCRIPTION

With reference to the cited figures, an embodiment of a detection apparatus 1 according to present disclosure is capable of identifying surface defects in objects. In general, the detection apparatus 1 is configured to provide detection data DS indicative of the presence of surface defects in each object 100 inspected. These detection data can be used for various purposes, for example for quality control or similar purposes.

The detection apparatus 1 is particularly suitable for detecting surface defects in industrial seals, in particular in "O-ring" type seals. Therefore, hereinafter it will be described with particular reference to this field of application, without wishing to limit the scope of such an apparatus unless otherwise specifically noted.

In fact, the detection apparatus 1 can be used to detect surface defects in objects of substantially any type, for example in any type of industrial component of relatively small size (generally on a millimetric scale). In principle, the surface defects detectable using the detection apparatus can be of substantially any type. For example, they can consist of micro-scratches, variations in surface roughness, variations in color, micro-cracks, micro-crevices, and so forth.

During operation of the detection apparatus, the object 100 to be inspected is advantageously laid on a support 150 preferably having a planar structure. Preferably, this support is movable with respect to the detection apparatus. For example, the support 150 can consist of a rotary table or a conveyor belt.

The detection apparatus 1 in an embodiment comprises an illuminating device 2 configured to illuminate the object 100 to be inspected.

Figure 1:
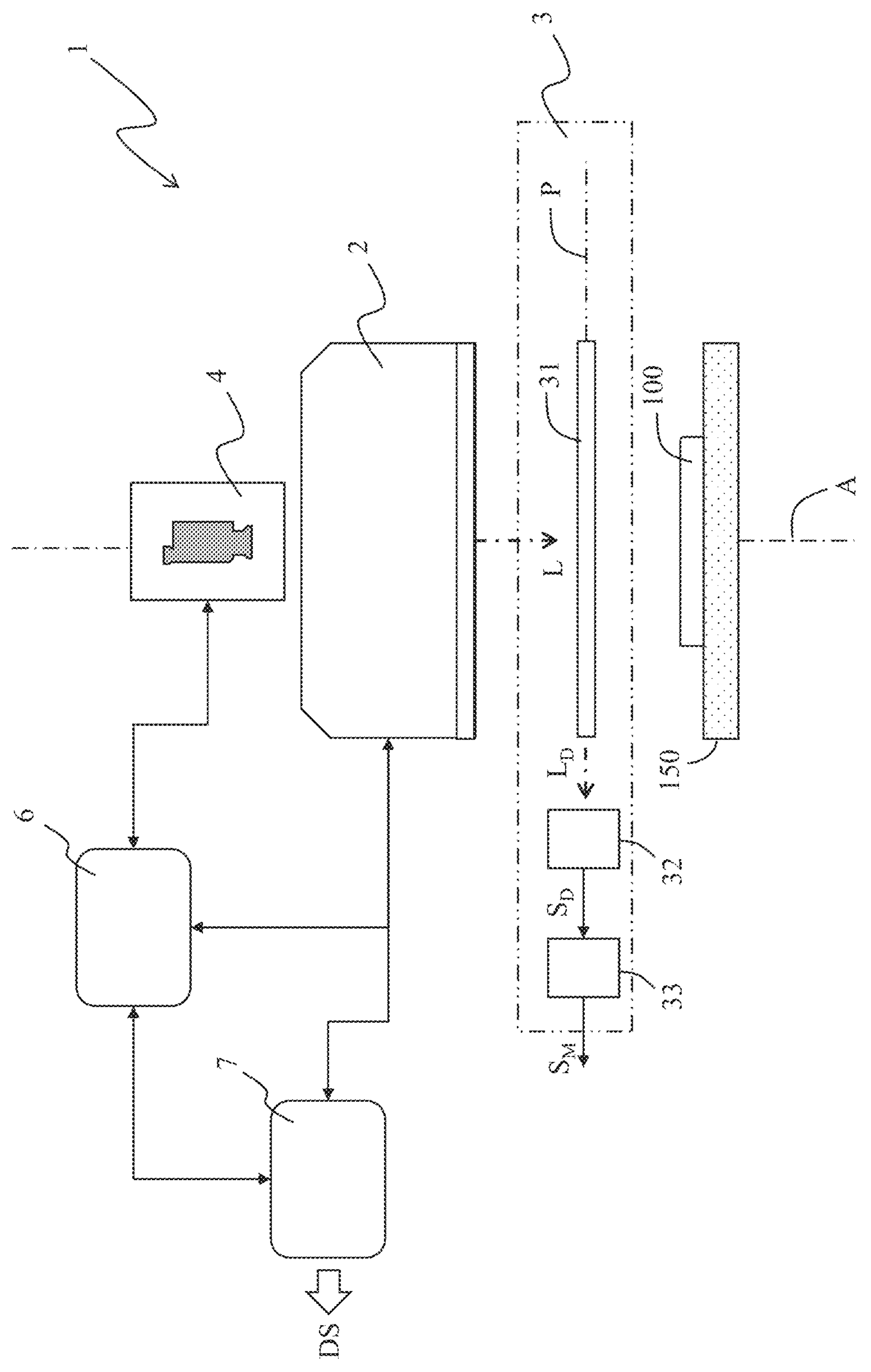
FIG. 1 is a block diagram illustrating an exemplary embodiment of a detection apparatus according to the present disclosure.

In general, the aforesaid illuminating device 2 is arranged to emit a light radiation L along at least an optical axis A and illuminate the object 100 to be inspected (FIG. 1).

The illuminating device 2 of the detection apparatus can advantageously comprise one or more illuminating devices 2A, 2B (FIGS. 4-7). Each illuminating device is configured to emit a corresponding light radiation $L_1$, $L_2$ along an optical axis A (which can be different for each illuminating device or coincident as illustrated in the cited figures) according to a corresponding predefined direction. Preferably, each illuminating device 2A, 2B comprises one or more corresponding light sources.

Preferably, each light source includes an assembly of light emitting diode (LED) devices, for example RGBY (red, green, blue, yellow) LED devices, capable of emitting the desired light radiation.

The light radiation $L_1$, $L_2$ emitted by each illuminating device 2A, 2B can be monochromatic or polychromatic, according to requirements.

Figure 4:
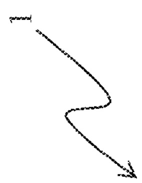
FIGS. 4-7 schematically illustrate further variant embodiments of the detection apparatus as disclosed herein.
Figure 4:
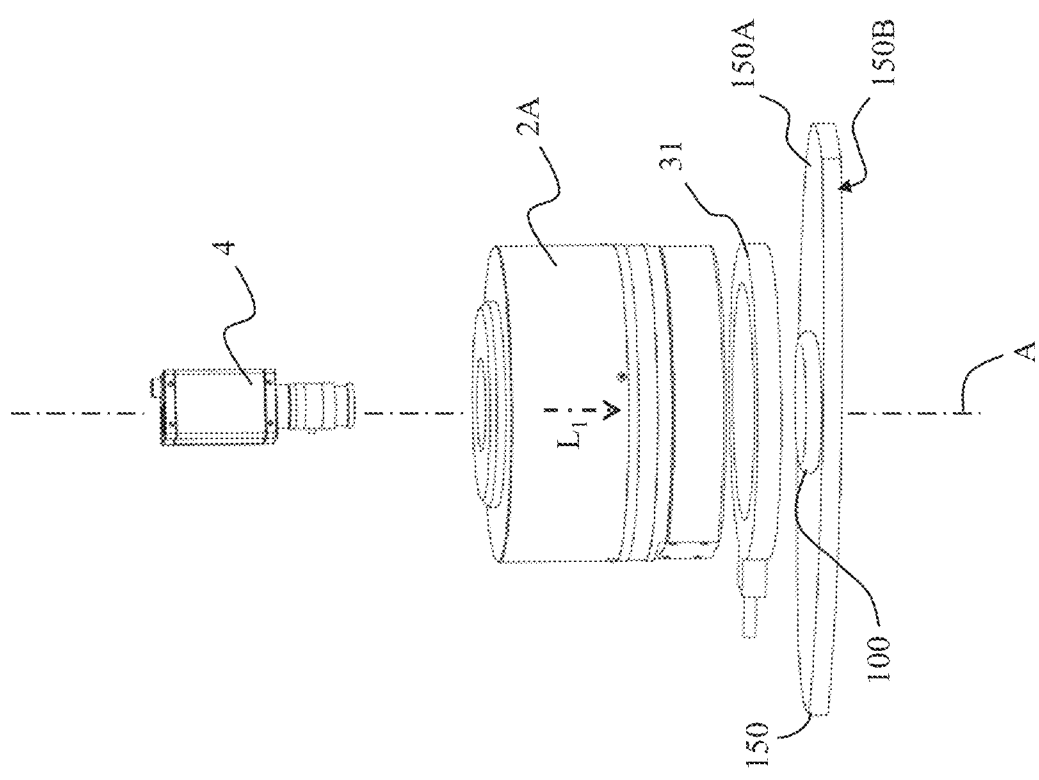
Figure 5:
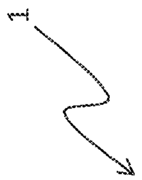
Figure 5:
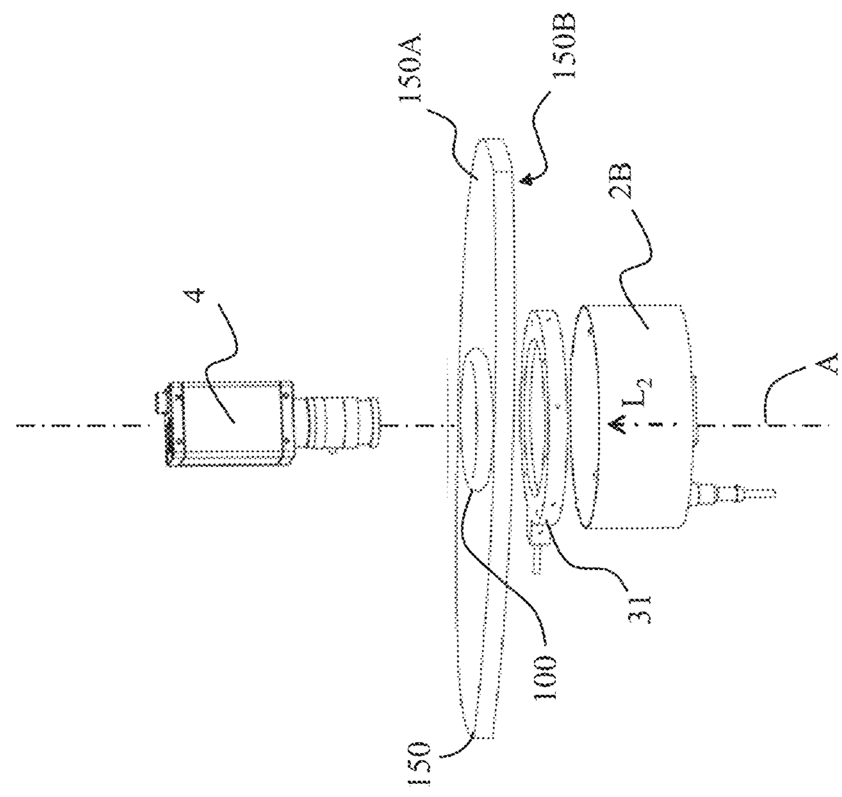

As represented in FIGS. 4 and 5, embodiments of the illuminating device 2 as disclosed herein may comprise a single illuminating device 2A or 2B arranged on a corresponding side of the support 150 of the object 100 to be inspected.

In the embodiment of FIG. 4, the illuminating device 2A faces a first surface 150A of the support 150 at which the object 100 to be inspected is placed. As can be noted, the illuminating device 2A emits a light radiation $L_1$ directed along the optical axis A, in the direction of the first surface 150A of the support 150, to illuminate the object 100 to be inspected.

In the embodiment of FIG. 5, the illuminating device 2B faces a second surface 150B of the support 150 opposite the first surface 150A, at which the object 100 to be inspected is placed. As can be noted, the illuminating device 2B emits a light radiation $L_2$ directed along the optical axis A, in the direction of the second surface 150B of the support 150 (hence in the opposite direction to the direction of the light radiation $L_1$ emitted by the illuminating device 2A in the embodiment of FIG. 4). In the embodiment of FIG. 5, the support 150 is advantageously made of optically transparent material in order to allow the illuminating device 2B to illuminate the object 100 to be inspected.

Figure 6:
Figure 6:
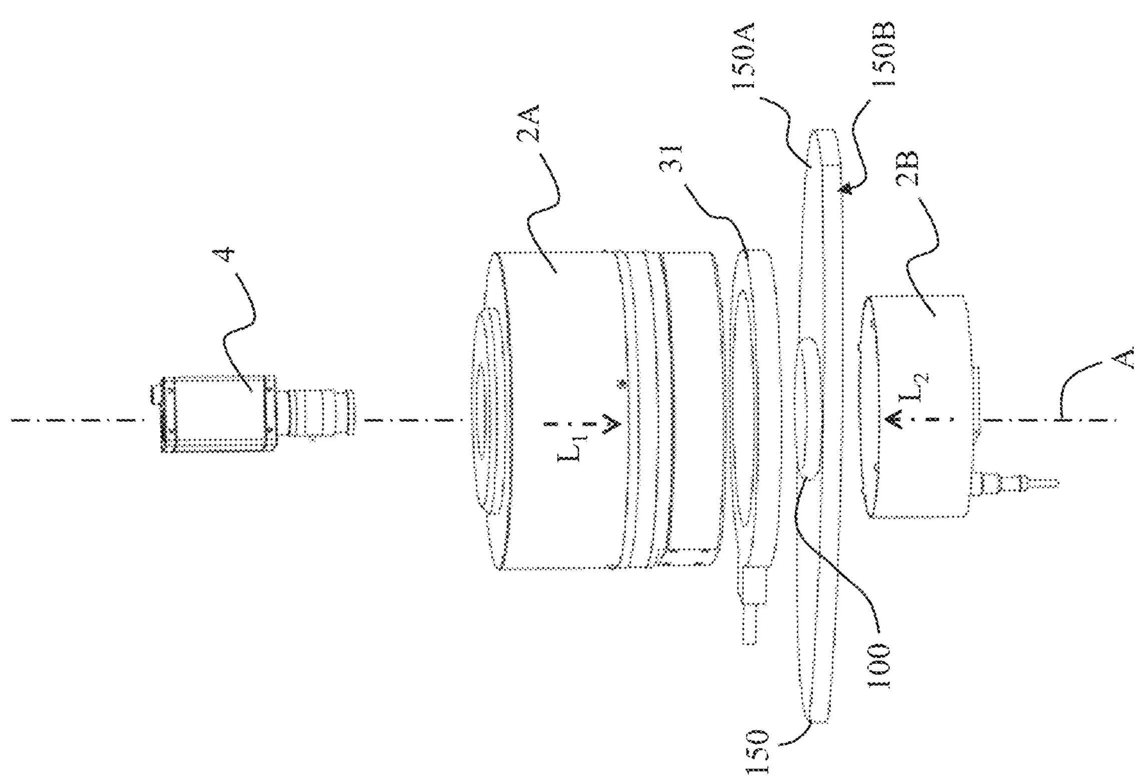
Figure 7:
Figure 7:
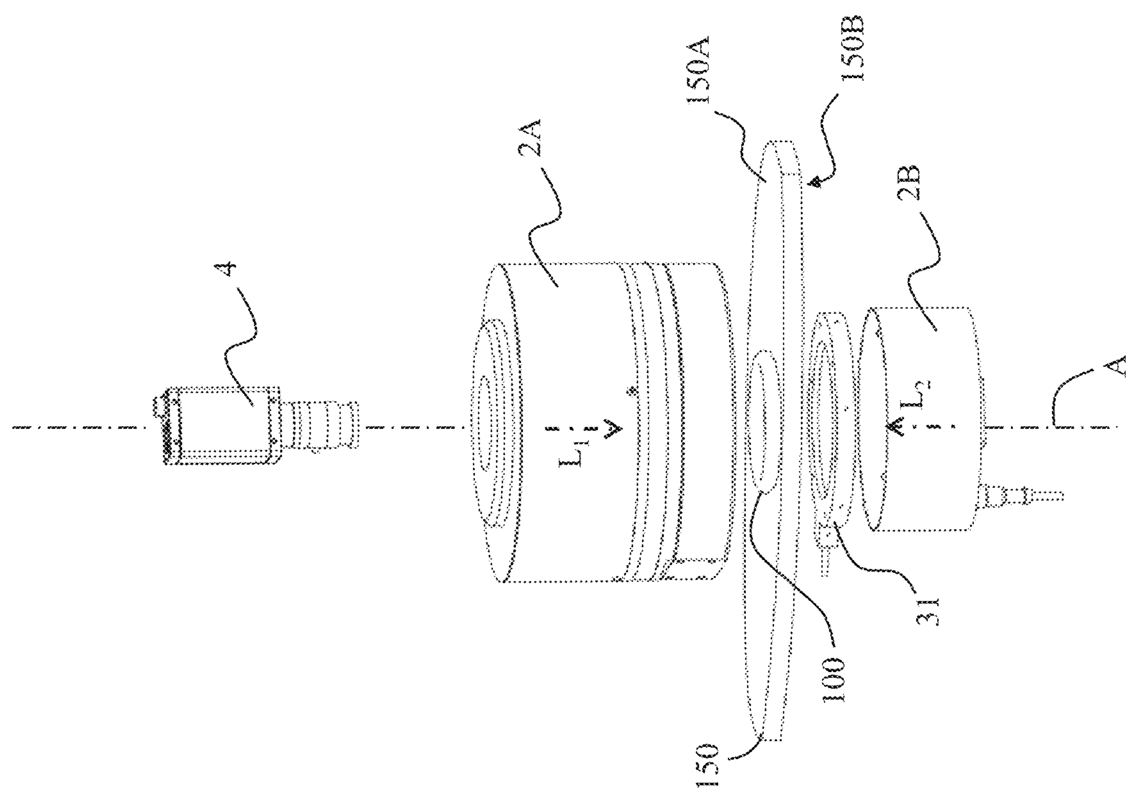

FIGS. 6 and 7 show embodiments of the invention in which the illuminating device 2 comprises a pair of illuminating devices 2A, 2B arranged on opposite sides of the support 150 of the object 100 to be inspected.

The illuminating devices 2A, 2B emit light radiations $L_1$, $L_2$ along a same optical axis A but oriented according to opposite directions (in practice, each toward a corresponding surface 150A, 150B of the support 150).

In this embodiment, the support 150 is advantageously made of optically transparent material to allow the illuminating devices 2A, 2B to illuminate the object 100 to be inspected at opposite sides. Naturally, the wavelengths of the light radiations $L_1$, $L_2$ emitted by the illuminating devices can be coincident or different to each other, according to requirements.

In a practical embodiment, the illuminating device 2 can be fixed to a suitable supporting structure (not illustrated).

In general, the illuminating device 2 can be produced at an industrial level according to known solutions and therefore, for brevity, it/they will be described below only with reference to the aspects of interest for the present disclosure.

According to an embodiment, the detection apparatus 1 comprises an image acquisition device, which may be one or more image acquisition devices 4, configured to acquire at least an image of the object 100, when illuminated by the illuminating device 2.

Preferably, the image acquisition device 4 is arranged coaxially with the illuminating device 2, along the same optical axis A.

According to some embodiments as disclosed herein, the image acquisition device 4 is configured to acquire one or more black and white (B/N) images of the object 100, when it is illuminated by the illuminating device 2 illustrated above.

In this case, the image acquisition device 4 can advantageously comprise at least an image sensor (not illustrated) formed by an array of pixels, for example an array of 2452×2056 pixels or 1600×1200 pixels. Optionally, the image acquisition device 4 can comprise a filter of the light radiation (not illustrated) operatively associated with the aforesaid image sensor to filter the light incident thereon and suitable electronic interface circuits (not illustrated) operatively associated with the image sensor to manage the information acquired thereby.

According to other embodiments as disclosed herein, the image acquisition device 4 may be configured to acquire one or more color images of the object 100, when the latter is illuminated by the illuminating device 2 illustrated above.

In this case, the image acquisition device 4 can advantageously comprise at least a color video camera, optionally operatively associated with a suitable Bayer filter.

In a practical embodiment according to the present disclosure, the image acquisition device 4 can also be fixed to a suitable supporting structure (not illustrated), for example the same supporting structure destined to support the illuminating device 2.

In general, the image acquisition device 4 can be produced at an industrial level according to known solutions and therefore, for brevity, they will be described below only with reference to the aspects of interest for the present disclosure.

According to one aspect as disclosed herein, the detection apparatus 1 comprises a data processor 7, which may be one or more data processors 7, configured to process one or more images relating to an object 100 inspected, acquired by the image acquisition device 4, and provide detection data DS indicative of the presence of surface defects in the object 100 inspected.

To process the images provided by the image acquisition device 4, the data processor 7 can advantageously implement suitable image processing or recognition algorithms of known type.

According to an aspect of the present disclosure, the detection apparatus 1 comprises a controller 6 configured to interact with some components of the detection apparatus (in particular with the illuminating device 2, the image acquisition device 4 and the data processor 7) to control the operation thereof through the exchange of suitable data signals and control signals.

For example, the controller 6 can be configured to control the assemblies of LED devices of the illuminating devices 2A, 2B to obtain the best emission spectrum as a function of the color of the object 100 to be inspected. In an industrial embodiment of an apparatus as disclosed herein, the data processor 7 and the controller 6 can collectively or independently comprise one or more devices for digital processing of the data, for example one or more microprocessors capable of executing software instructions stored on a storage medium.

In general, the data processor 7 and the controller 6 can be produced according to known circuit solutions. For example, the detection apparatus 1 could comprise a control and processing unit provided with one or more microprocessor cards suitably arranged to carry out the functions required for the data processor 7 and the controller 6.

According to an embodiment, the detection device 1 comprises at least a measuring device 3 of the light radiation received by the object 100 to be inspected.

In general, the measuring device 3 is configured to provide measurement signals $S_M$ indicative of the intensity of the light radiation received by the object 100 to be inspected.

The measurement signals $S_M$ provided by the measuring device 3 can be used for various purposes.

For example, they can be supplied to the aforesaid control and processing unit of the detection apparatus to make measurement data available at a user interface or to provide suitable alarm signals, if the measurement signals $S_M$ are indicative of a light radiation having an intensity below a given threshold.

According to a further example, the measurement signals $S_M$ can be provided as feedback to the controller 6 so that the latter are capable of regulating operation of the light sources of the illuminating device 2 as a function of the light radiation actually received by the object 100 to be inspected.

According to a further example, the measurement signals $S_M$ can be provided as feedback to the data processor 7 so that the latter are capable of processing the images of the object 100 inspected, provided by the image acquisition device 4, based on the actual lighting conditions of said object.

According to an embodiment, the measuring device 3 comprises at least a platelike body 31 arranged to intersect the optical axis A of the illuminating device 2 and receive the light radiation L, $L_1$, $L_2$ with which the latter illuminate the object 100 to be inspected.

Each platelike body 31 comprises a plate 311 of optically active material, i.e., capable of interacting with the light radiation received from the illuminating device.

Preferably, each platelike body 31 is arranged so that the plate 311 of optically active material is arranged coaxially with the optical axis A of the illuminating device so as to have opposite surfaces through which the light radiation emitted by the latter passes.

Preferably, each platelike body 31 is arranged so that the extension plane P of the plate 311 of optically active material is perpendicular to the optical axis A of the illuminating device.

In principle, the plate 311 of optically active material can have any shape, for example circular, as illustrated in the cited figures.

Preferably, the platelike body 31 is arranged so as to receive the light radiation emitted by the illuminating device 2 in proximity with respect to the object 100 to be inspected, when this object is placed on the related support 150.

FIG. 4 shows an embodiment according to the present disclosure in which the measuring device 3 comprises a platelike body 31 operatively associated with the single illuminating device 2A of the apparatus. In this case, the platelike body 31 is arranged in an intermediate position between an illuminating device 2A and the first surface 150A of the support 150, at which the object 100 is placed.

FIG. 5 also shows an embodiment according to the present disclosure in which a platelike body 31 is operatively associated with the single illuminating device 2B of the apparatus. In this case, the platelike body 31 is arranged in an intermediate position between an illuminating device 2B and a second surface 150B of the support 150. The latter is a surface of the support 150 in a position opposite a first surface 150A at which the object 100 is placed.

FIG. 6 shows an embodiment according to the present disclosure in which a single platelike body 31 is operatively associated with a pair of illuminating devices 2A, 2B of the apparatus. In this case, the platelike body 31 is arranged in an intermediate position between the illuminating device 2A, positioned above the support 150, and a first surface 150A of said support, at which the object 100 is placed.

FIG. 7 shows another embodiment according to the present disclosure in which a single platelike body 31 is operatively associated with a pair of illuminating devices 2A, 2B of the apparatus. In this case, the platelike body 31 is arranged in an intermediate position between the illuminating device 2B, positioned below the support 150, and a second surface 150B of said support, in a position opposite a first surface 150A, at which the object 100 is placed.

As mentioned above, in these exemplary embodiments, the detection device 1 comprises a single platelike body 31 placed in proximity of the support 150 at which the object 100 to be inspected is placed. In any case, other embodiments according to the present disclosure (not illustrated) are also possible, in which the measuring device 3 comprises several platelike bodies 31, each of which is operatively associated with a corresponding illuminating device, according to methods very similar to those illustrated by FIGS. 6-7.

Figure 3:
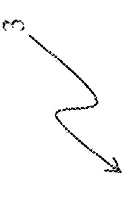
FIG. 3 illustrates an embodiment of a measuring device used in the detection apparatus as disclosed herein.
Figure 3:
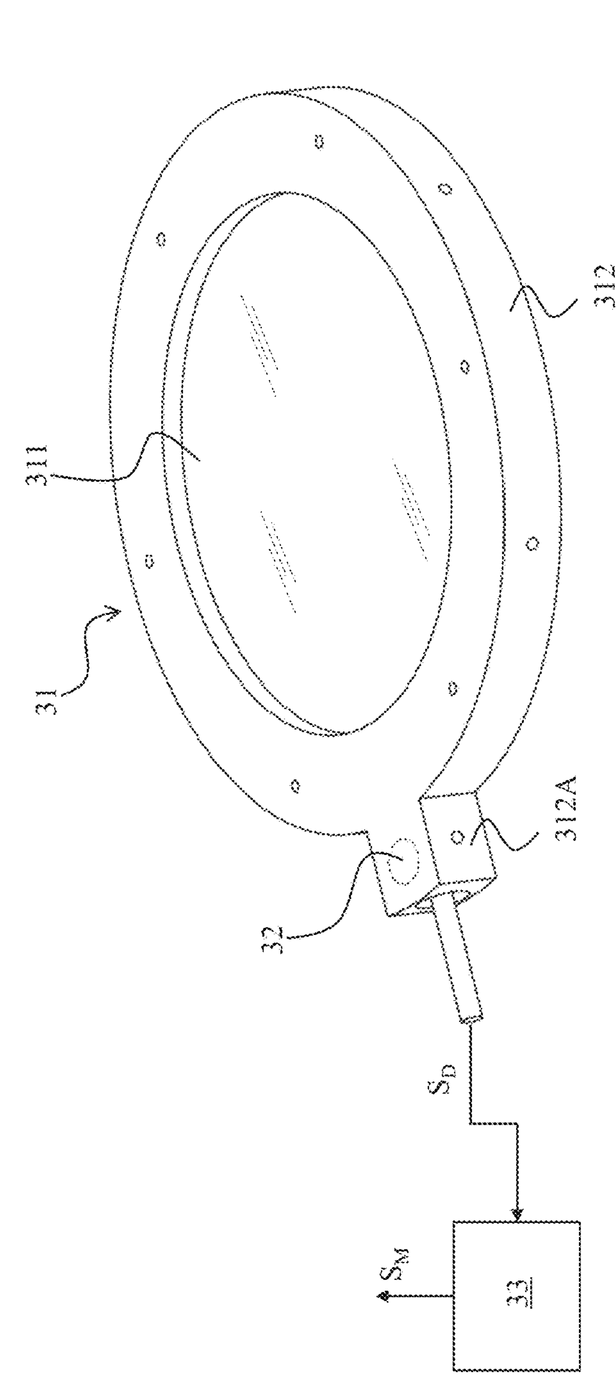

Preferably, each platelike body 31 comprises a frame 312 mechanically coupled according to known methods to the plate 311 of optically active material. The frame 312 is advantageously arranged to support the plate 311 of optically active material and fix it to a suitable supporting structure (not illustrated), for example the same supporting structure destined to support the illuminating device 2 and the image acquisition device 4 (FIG. 3).

According to the invention, the plate 311 of optically active material is capable of deflecting, along its extension plane P and toward a perimeter edge thereof, a predetermined portion $L_D$ of the light radiation received from the illuminating device.

Preferably, the plate 311 of optically active material is capable of deflecting a part of the light radiation received according to an appropriate direction radial with respect to the optical axis A.

Preferably, the plate 311 of optically active material is made of PMMA (preferably Plexiglas™ Endlighten, for example of the type described in the European patent application EP15711837.3) in which an effective amount of colorless diffusive impurities is dispersed. These impurities dispersed in the PMMA are capable of forming a number of reflection planes inside the plate 311, which are capable of deflecting, toward the edge of said plate, the optical path of a part of the light radiation received at a surface exposed to the light radiation.

Figure 2B:
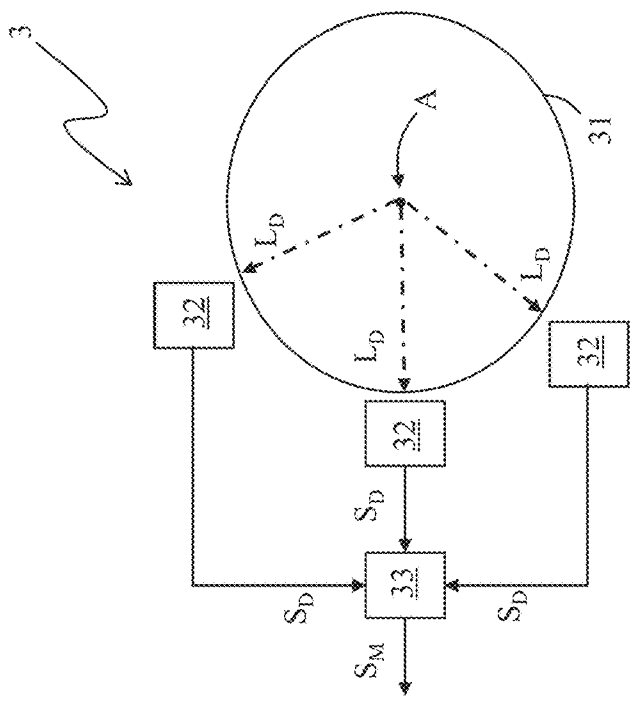
FIGS. 2A, 2B schematically illustrate some variant embodiments of the detection apparatus as disclosed herein.
Figure 2B:
Figure 2A:
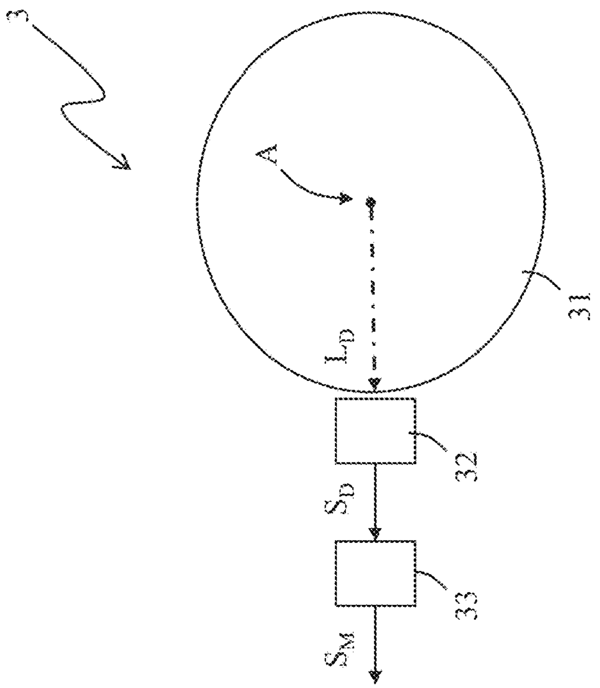

According to embodiments of the present disclosure, the measuring device 3 comprises one or more light sensors 32 optically coupled to each platelike body 31, more in particular to the plate 311 of optically active material of each platelike body (FIGS. 1-3). Each light sensor 32 is configured to receive the portion $L_D$ of light radiation emitted by the illuminating device 2 and deflected by the plate 311 and provide detection signals $S_D$ indicative of the light intensity of the light radiation received.

According to some embodiments according to the present disclosure, each light sensor 32 is configured to receive a monochromatic light radiation $L_D$. In this case, each light sensor can advantageously comprise a photodiode optically coupled to a perimeter edge of the plate 311 according to known methods and electrically connected to a suitable signal processing circuit network.

According to some embodiments according to the present disclosure, each light sensor 32 is configured to receive a polychromatic light radiation $L_D$. In this case, each light sensor can advantageously comprise an array of photodiodes optically coupled to a perimeter edge of the plate 311 according to known methods and electrically connected to a suitable signal processing circuit network.

Preferably, each light sensor 32 is arranged at a perimeter edge of the respective plate 311 so as to be optically coupled thereto.

According to some embodiments according to the present disclosure (FIGS. 2A, 3), the measuring device 3 comprises a single light sensor 32 coupled to each platelike body 31. This light sensor 32 is optically coupled to a perimeter edge of the plate 311 in radial position with respect to the optical axis A.

According to the embodiment of FIG. 3, the light sensor 32 is advantageously housed in a seat 312A formed in the frame 312 of the platelike body.

According to other embodiments according to the present disclosure (FIG. 2B), the measuring device 3 comprises a plurality of light sensors 32 coupled to each platelike body 31. Each light sensor is optically coupled to a perimeter edge of the plate 311 in a corresponding radial position with respect to the optical axis A. Also in this case, each light sensor can advantageously be housed in a corresponding seat of the frame of the platelike body.

According to an embodiment, the measuring device 3 comprises at least an electronic signal processing unit 33 operatively coupled to the aforesaid one or more light sensors 32.

Each electronic unit 33 is configured to receive and process the detection signals $S_D$ provided by one or more light sensors 32 and provide measurement signals $S_M$ indicative of the intensity of the light radiation received by the object 100.

Preferably, the measuring device 3 comprises a single electronic unit 33 operatively coupled to each light sensor 32, also when this measuring device comprises several platelike bodies 31.

However, embodiments according to the present disclosure in which the measuring device 3 comprises an electronic unit 33 for each platelike body 31 are also possible.

Preferably, each electronic unit 33 can comprise one or more circuit boards, for example a microprocessor, appropriately arranged to perform the aforesaid functions.

In a practical implementation according to the present disclosure, each electronic unit 33 can be integrated in the above-mentioned control and processing unit of the detection apparatus 1, together with the data processor 7 and with the controller 6.

A detection apparatus as disclosed herein may accordingly have significant advantages with respect to the prior art.

The measuring device 3 illustrated above allows indirect measurement of the light radiation received by the object 100 to be inspected.

By exploiting the properties of the optically active material of the plate 311 of each platelike body, the measuring device 3 is capable of measuring the light intensity of a predetermined portion $L_D$ of the light radiation with which the object 100 to be inspected is illuminated by the illuminating device. In this way, the measuring device 3 can easily calculate measurement data $S_M$ indicative of the intensity of the total light radiation received by the object 100 to be inspected.

Unlike the prior art solutions, with the measuring device 3 it is possible to detect, in real time, i.e., without time delays linked to the periodic nature of the tests carried out, any decrease in the intensity of the light radiation that reaches the objects to be inspected. Naturally, this circumstance makes it possible to act promptly with the most appropriate maintenance operations, as soon as a problem of illumination of the objects to be inspected is detected.

The measuring device 3 measures the intensity of the light radiation in an area close to the object 100 to be inspected. Unlike other prior art solutions, which merely measure the intensity of the light radiation as emitted from the light sources of the illuminating device, with the measuring device 3 it is possible to detect a decrease in the light intensity linked to opacification or soiling of surfaces through which the optical path of the light radiation emitted by the illuminating device passes.

Due to the presence of the measuring device 3, the detection apparatus according to the present disclosure is thus capable of ensuring a high level of accuracy, consistent over time, of the inspection activities carried out and relatively low overall operating costs with respect to prior art systems of the same type. Measurement of the light intensity that illuminates the objects to be inspected can advantageously be carried out automatically, without the intervention of an operator. The detection apparatus according to the present disclosure has a particularly compact structure which makes it easy to integrate in an object inspection station, in particular in a station for inspecting industrial seals of O-ring type.

The detection apparatus according to the present disclosure can be easily produced at an industrial level at costs competitive with the prior art solutions available.

What is claimed is:

1. An apparatus for detecting surface defects in objects, the apparatus comprising:

one or more illumination devices configured to emit at least a light radiation along at least an optical axis and illuminate an object to be inspected;

a measuring device configured to measure the light radiation received by the object, and comprising at least a platelike body arranged to intersect the optical axis and receive the light radiation with which the one or more illuminating devices illuminate the object, wherein the platelike body comprises a plate of optically active material capable of deflecting, along an extension plane of the plate, a predetermined portion of the light radiation received from the one or more illumination devices, and wherein the plate of optically active material comprises particulate scatterers dispersed therein, the particulate scatterers being configured to deflect the predetermined portion of the light radiation along the extension plane of the plate, the measuring device further comprising at least a light sensor optically coupled to the at least a platelike body and configured to receive the portion of light radiation deflected by the plate and provide detection signals indicative of a light intensity of the light radiation so received.

2. The apparatus of claim 1, wherein the plate of optically active material is made of polymethyl methacrylate (PMMA) and the particulate scatterers comprise colorless diffusive impurities.

3. The apparatus of claim 1, wherein the at least a platelike body is arranged so that an extension plane of the plate of optically active material is orthogonal to the optical axis.

4. The apparatus of claim 1, wherein the at least a light sensor is configured to receive a monochromatic light radiation.

5. The apparatus of claim 1, wherein the at least a light sensor is configured to receive a polychromatic light radiation.

6. The apparatus of claim 1, wherein the measuring device comprises a single light sensor optically coupled to each platelike body.

7. The apparatus of claim 1, wherein the measuring device comprises a plurality of light sensors optically coupled to each platelike body.

8. The apparatus of claim 1, wherein the measuring device comprises a platelike body arranged at an intermediate position between a first illumination device of the one or more illumination devices and a first surface of a support, at which the object is placed.

9. The apparatus of claim 8, wherein the one or more illumination devices comprises a second illumination device, and the platelike body is arranged at the intermediate position further between the second illumination device and a second surface of the support, wherein the object is placed at the first surface of the support opposite the second surface, and the support is made of optically transparent material.

10. The apparatus of claim 1, wherein the measuring device comprises an electronic signal processing unit operatively coupled to the at least a light sensor, and configured to receive and process the detection signals and provide measurement signals indicative of the light radiation received by the object.

11. The apparatus of claim 1, comprising an image acquisition device configured to acquire one or more images of the object, when illuminated by the one or more illumination devices.

12. The apparatus of claim 11, comprising a data processor configured to process the images acquired by the image acquisition device and provide detection data indicative of the presence of surface defects on the object.

13. An object inspection station comprising:

a detection apparatus for detecting surface defects in objects, the apparatus comprising: one or more illumination devices configured to emit at least a light radiation along at least an optical axis and illuminate an object to be inspected;

a measuring device configured to measure the light radiation received by the object, and comprising at least a platelike body arranged to intersect the optical axis and receive the light radiation with which the one or more illuminating devices illuminate the object, wherein the platelike body comprises a plate of optically active material capable of deflecting, along an extension plane of the plate, a predetermined portion of the light radiation received from the one or more illumination devices, and wherein the plate of optically active material comprises particulate scatterers dispersed therein, the particulate scatterers being configured to deflect the predetermined portion of the light radiation along the extension plane of the plate, the measuring device further comprising at least a light sensor optically coupled to the at least a platelike body and configured to receive the portion of light radiation deflected by the plate and provide detection signals indicative of a light intensity of the light radiation so received.

14. The object inspection station of claim 13, wherein the plate of optically active material is made of polymethyl methacrylate (PMMA) and the particulate scatterers comprise colorless diffusive impurities.

15. The object inspection station of claim 13, wherein the at least a platelike body is arranged so that an extension plane of the plate of optically active material is orthogonal to the optical axis.

16. The object inspection station of claim 13, wherein the measuring device comprises a platelike body arranged at an intermediate position between a first illumination device of the one or more illumination devices and a first surface of a support, at which the object is placed.

17. The object inspection station of claim 16, wherein the platelike body is arranged at the intermediate position further between a second illumination device of the one or more illumination devices and a second surface of the support, wherein the object is placed at the first surface of the support opposite the second surface, and the support is made of optically transparent material.

18. The object inspection station of claim 13, wherein the measuring device comprises an electronic signal processing unit operatively coupled to the at least a light sensor, and configured to receive and process the detection signals and provide measurement signals indicative of the light radiation received by the object.

19. The object inspection station of claim 13, comprising an image acquisition device configured to acquire one or more images of the object, when illuminated by the one or more illumination devices.

20. The object inspection station of claim 19, comprising a data processor configured to process the images acquired by the image acquisition device and provide detection data indicative of the presence of surface defects on the object.

* * * * *